(12) United States Patent
Pacella et al.

(10) Patent No.: US 8,638,791 B2
(45) Date of Patent: Jan. 28, 2014

(54) HETEROGENEOUS FORWARDING INFORMATION BASES IN LINE CARDS

(75) Inventors: Dante J. Pacella, Charles Town, WV (US); Norman Richard Solis, Fairfax, VA (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 645 days.

(21) Appl. No.: 12/624,641

(22) Filed: Nov. 24, 2009

(65) Prior Publication Data

US 2011/0122874 A1 May 26, 2011

(51) Int. Cl.
*H04L 12/28* (2006.01)

(52) U.S. Cl.
USPC ....... 370/392; 370/395.31; 370/396; 370/398

(58) Field of Classification Search
None
See application file for complete search history.

(56) References Cited

U.S. PATENT DOCUMENTS

| 6,735,198 | B1 * | 5/2004 | Edsall et al. | 370/389 |
|---|---|---|---|---|
| 7,313,666 | B1 * | 12/2007 | Saminda De Silva et al. | 711/173 |
| 2002/0051450 | A1 * | 5/2002 | Ganesh et al. | 370/389 |
| 2005/0025179 | A1 * | 2/2005 | McLaggan et al. | 370/468 |
| 2005/0169281 | A1 * | 8/2005 | Ko et al. | 370/400 |
| 2006/0098675 | A1 * | 5/2006 | Okuno | 370/412 |
| 2010/0215047 | A1 * | 8/2010 | Filsfils et al. | 370/401 |
| 2011/0075680 | A1 * | 3/2011 | Sun et al. | 370/419 |

\* cited by examiner

*Primary Examiner* — Faruk Hamza
*Assistant Examiner* — Thinh Tran

(57) ABSTRACT

A device may include a control module configured to distribute sets of routing entries to line cards, each of the sets including a portion of a master table for looking up routes based on network addresses. In addition, the device may include a first one of the line cards configured to receive one of the sets of routing entries, store the received set of routing entries in a local table, receive a packet from a network, obtain a routing entry using the local table based on an address associated with the packet, and send the obtained packet to a second one of the line cards, the second line card associated with the routing entry. Further, the device may include the second line card configured to forward the packet toward the address in the network.

19 Claims, 8 Drawing Sheets

HETEROGENEOUS FORWARDING INFORMATION BASES IN LINE CARDS

BACKGROUND INFORMATION

A typical router has two functions: a routing function and forwarding function. The routing function entails sending, receiving, and processing messages under different routing protocols (e.g., Border Gateway Protocol (BGP), Intermediate-System to Intermediate-System (IS-IS) protocol, Open Shortest Path First (OSPF) protocol, etc.), to obtain and store information, about different paths from local routers to reachable destinations. The router stores the information in a route information base (RIB). The router uses the RIB to collect, in a forwarding information base (FIB), information for selecting best paths for the reachable destinations.

The forwarding function entails receiving and forwarding packets toward their destinations in accordance with the FIB.

DETAILED DESCRIPTION OF PREFERRED EMBODIMENTS

The following detailed description refers to the accompanying drawings. The same reference numbers in different drawings may identify the same or similar elements.

As used herein, the term "router" may refer to a network level 2 or level 3 (e.g., an Internet Protocol (IP) level) router or switch (e.g., Multiprotocol Label Switching (MPLS) router). The term "packet," as used herein, may refer to an IP packet, datagram, cell, a fragment of an Internet Protocol (IP) packet, or other types of data that may be carried at a specified communication layer. The term "master FIB" may refer to a forwarding information base (FIB) that includes all forwarding information maintained within a router.

As described below, a line card of a router may include a local forwarding information base (FIB). Because the local FIB may be smaller than the master FIB of the router, using the local FIB in place of the master FIB may allow each of the line cards to consume less memory, and therefore, scale with increasing FIB entries over time.

Figure 1:
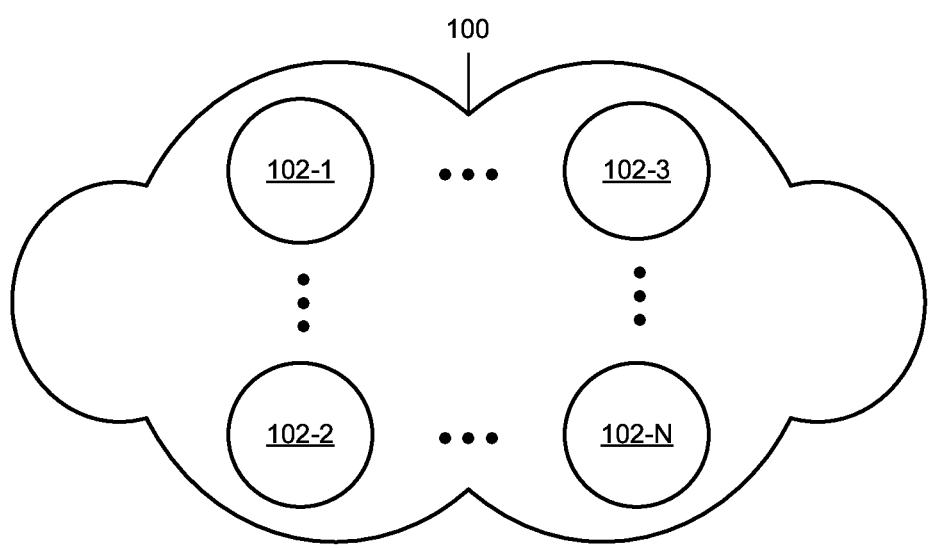
FIG. 1 shows an exemplary network that includes exemplary routers in which concepts described herein may be implemented.

FIG. 1 illustrates a network 100 in which concepts described herein may be implemented. Network 100 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 1, network 100 may include devices 102-1 through 102-N (individually referred to herein as a "device 102-x"). Device 102-x may include, for example, a router, a switch, a gateway, a server, a personal computer, a mobile computer (e.g., a laptop computer, a cell phone, etc.), etc. Although device 102-x may be implemented as any computer-like device, in the following description, device 102-x will be described in terms of a router/switch.

Figure 2:
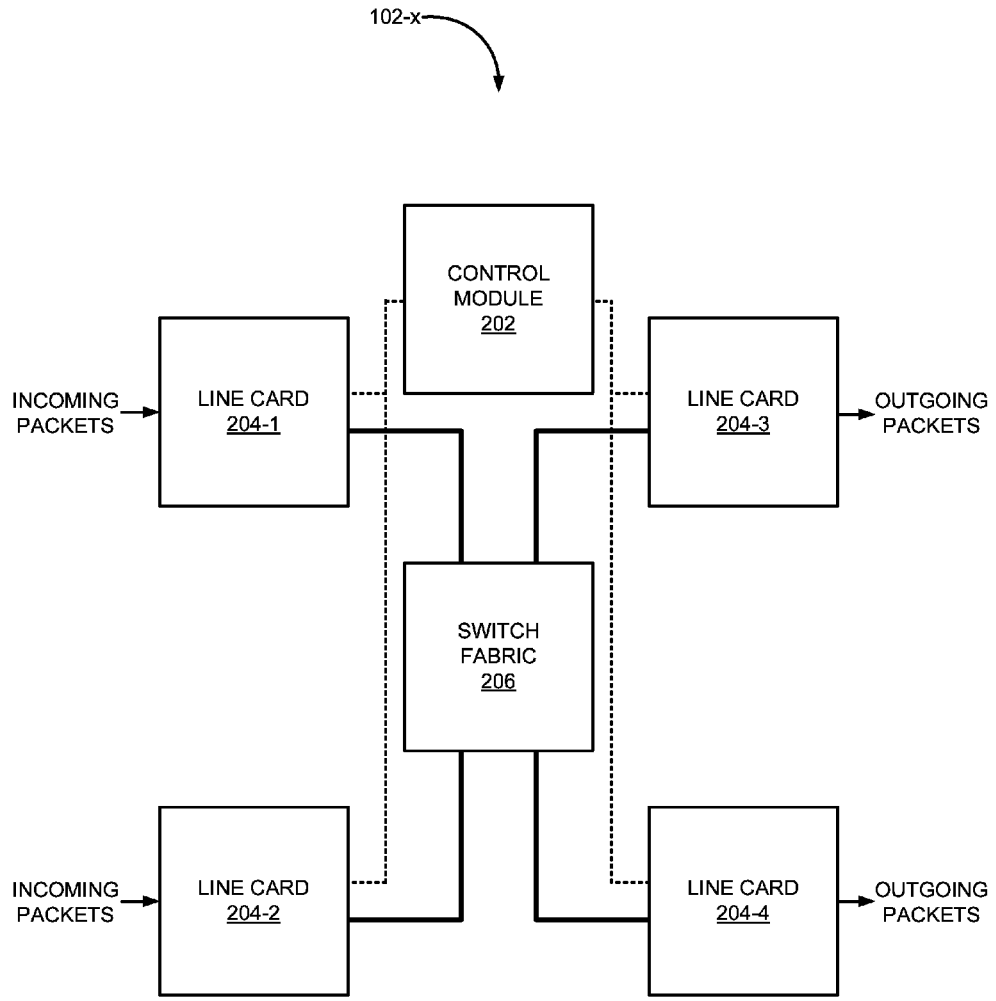
FIG. 2 shows exemplary components of a router of FIG. 1.

FIG. 2 illustrates a router 102-x according to an exemplary implementation. Router 102-x may perform routing and forwarding functions. In performing the routing function, router 102-x may exchange messages with other network devices to derive a forwarding information base (FIB), which describes best paths to network destinations. In performing the forwarding function, router 102-x may receive packets from one or more physical links, process the packets to determine their destinations, and transmit the packets on one or more physical links in accordance with the determined destinations or other properties of the packets.

As shown in FIG. 2, router 102-x may include a control module 202, line cards 204-1 through 204-4 (collectively "line cards 204" and generically "line card 204-x"), and a switch fabric 206. Control module 202 may include components for managing routes, flow statistics, and/or other types of information that may require centralized processing. For example, control module 202 may gather or disseminate routing information from/to other routers 102 in accordance with routing/signaling protocols, organize the routing information in a lookup table, etc. In another example, control module 202 may create a lookup table (e.g., a forwarding information base (FIB)) and distribute portions of the lookup table to line cards 204.

Line card 204-x may include components for receiving packets from devices or components in network 100 and for transmitting the packets to other devices in network 100. In addition, line card 204-x may forward packets, classify packets, etc. In forwarding packets, line card 204-x may act as an ingress line card and/or an egress line card. Switch fabric 206 may include switches for conveying packets from line cards 204 or other modules (not shown) to other line cards 204 or other modules.

Router 102-x may include fewer, additional and/or different components than those shown in FIG. 2. For example, router 102-x may include additional or fewer line cards or additional control modules. In another example, router 102-x may include components for performing deep packet inspection (DPI).

Figure 3A:
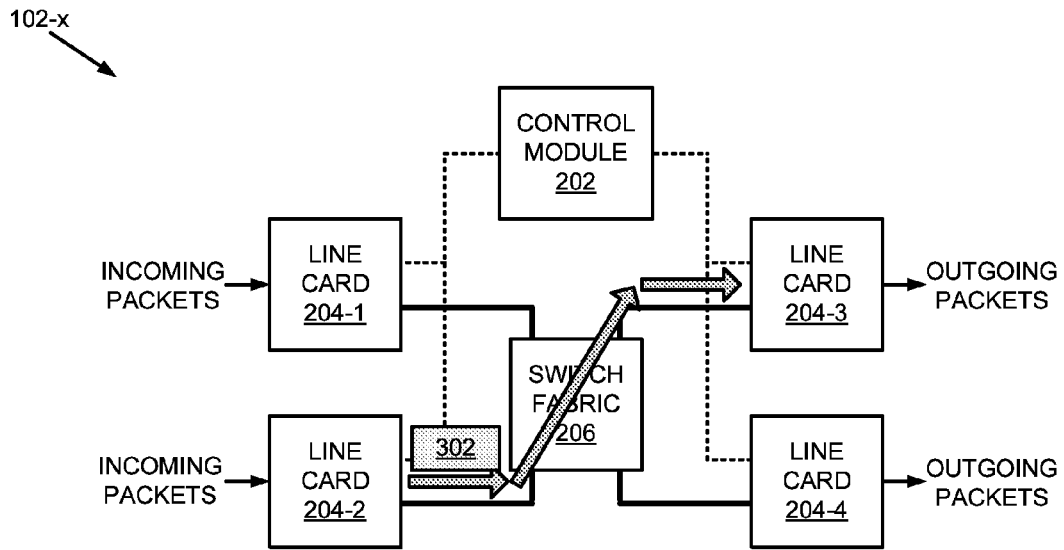
FIGS. 3A and 3B illustrate examples of a line card of FIG. 2 acting as an ingress line card or egress line card.
Figure 3B:
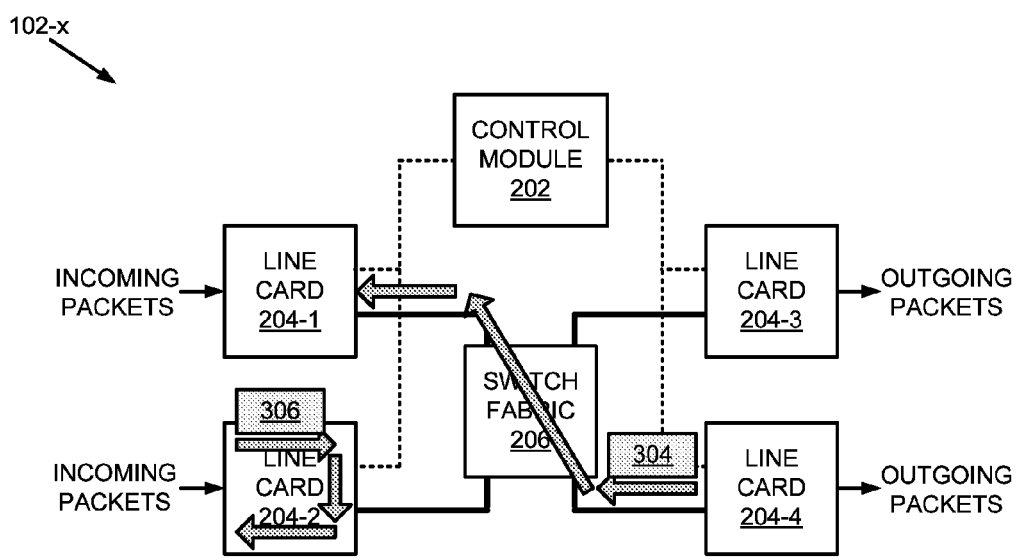

FIGS. 3A and 3B illustrate examples of line card 204-x acting as an ingress or egress line card. In FIG. 3A, a packet 302 may be received at line card 204-2 from network 100 via a port (not shown), forwarded to line card 204-4 via switch fabric 206, and sent toward its destination in network 100 from line card 204-4 via another port. In FIG. 3B, a packet 304 may be received at line card 204-4 from network 100, forwarded to line card 204-1 via switch fabric 206, and sent to its destination in network 100 from line card 204-1. In addition, in FIG. 3B, packet 306 may be received at line card 204-2 from network 100 through one port and sent towards its destination in network 100 by line card 204-2 through another port. Depending on the implementation, packet 406 may or may not pass through switch fabric 306.

Figure 4A:
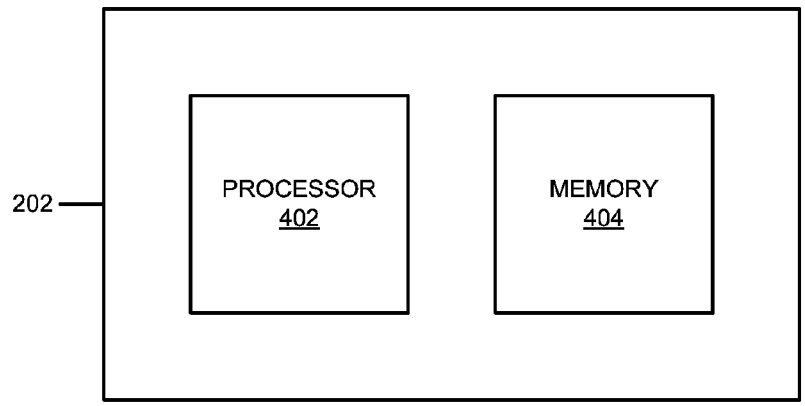
FIG. 4A is a block diagram illustrating exemplary components of the control module of FIG. 2.

FIG. 4A is a block diagram illustrating exemplary components of control module 202. As shown, control module 202 may include a processor 402 and a memory 404. Depending on the implementation, control module 402 may include additional, fewer, and/or different components than those illustrated in FIG. 4A.

Processor 402 may include one or more processors, microprocessors, Application Specific Integrated Circuits (ASICs), and/or Field Programmable Gate Arrays (FPGAs), and/or other processing logic. In some implementations, processor 402 may include processors dedicated to more specific functions, such as memory management, packet inspection, etc. Memory 404 may include static memory, such as read only memory (ROM), and/or dynamic memory, such as random access memory (e.g., dynamic RAM (DRAM), synchronous DRAM, static RAM (SRAM), etc.), or onboard cache, for storing data and machine-readable instructions. In addition, memory 404 may also include storage media, such as a magnetic and/or optical storage/recording medium. In some implementations, a portion of memory 404 may be mounted under a directory or mapped to a drive.

Figure 4B:
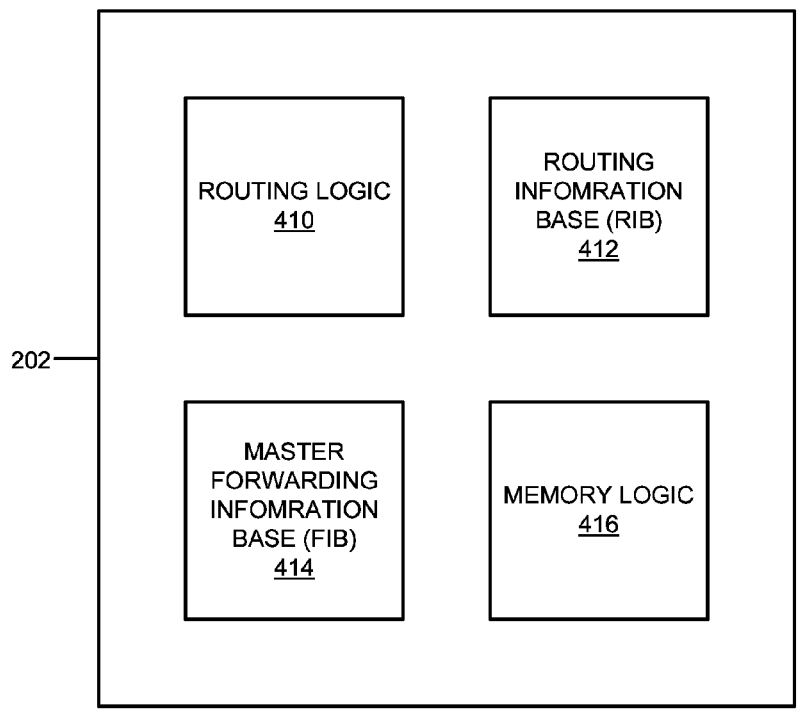
FIG. 4B is a block diagram illustrating exemplary functional components of the control module of FIG. 2.

FIG. 4B is a block diagram illustrating exemplary functional components of control module 202. As shown, control module 202 may include routing logic 410, a routing information base (RIB) 412, a master forwarding information base (FIB) 414, and memory logic 416. Depending on the implementation, control module 202 may include additional, fewer, or different functional components. For example, control module 202 may include a firewall application, packet inspection application, label information base (LIB), master label forwarding information base (LFIB), etc. In another example, in some implementations, routing logic 410 and/or memory logic 416 may be integrated into a single component.

Routing logic 410 may include hardware and/or software for communicating with other routers to gather and store routing information in a RIB or LIB, in accordance with one or more routing protocols. In addition, routing logic 402 may obtain a list of optimal paths for destinations based on a RIB or LIB, and store them in a FIB or LFIB.

RIB 412 may include descriptions of paths and metrics under different routing protocols. Master FIB 414 may include a list of optimal paths for destinations and/or classless inter-domain routing (CIDR) prefixes, each of which designates a range/group of destination addresses. Master FIB 414 may be optimized for fast lookups of line cards 204 via which packets may exit router 102-x and travel toward their destinations.

Memory logic 416 may distribute master FIB 414 or portions of master FIB 414 to line cards 204 when routing logic 410 has updated/changed RIB 412 and master FIB 414. Depending on the implementation and/or configuration, memory logic 416 may distribute master FIB 414 to line cards 204 in different ways. For example, in one implementation/configuration, memory logic 416 may send copies of master FIB 414 to each of line cards 204.

In another implementation/configuration, memory logic 416 may partition master FIB 414 into segments of approximately equal size, and send each segment to different line card 204-x. Memory logic 416 may partition master FIB 414, for example, based on CIDR prefixes, pointer indices, memory locations, etc.

In partitioning master FIB 414 into different segments, memory logic 416 may assign each entry in the master FIB 414 to a particular segment based on a pseudo-random approach (e.g., based on output of a random number generator, an arbitrary, round-robin, etc.), based on locality (e.g., based on an association between a next-hop destination of the entry and egress line card 204-x to receive the segment, based on whether addresses of a CIDR prefix are reachable from line card 204-x that is to receive the segment, etc.), etc.

In the above, because memory logic 416 may distribute a portion of master FIB 414 to line card 214-x, line card 204-x may store less information than that in master FIB 414. This may allow line card 204-x to consume less memory, and therefore, over time, scale with increasing master FIB entries.

Figure 5A:
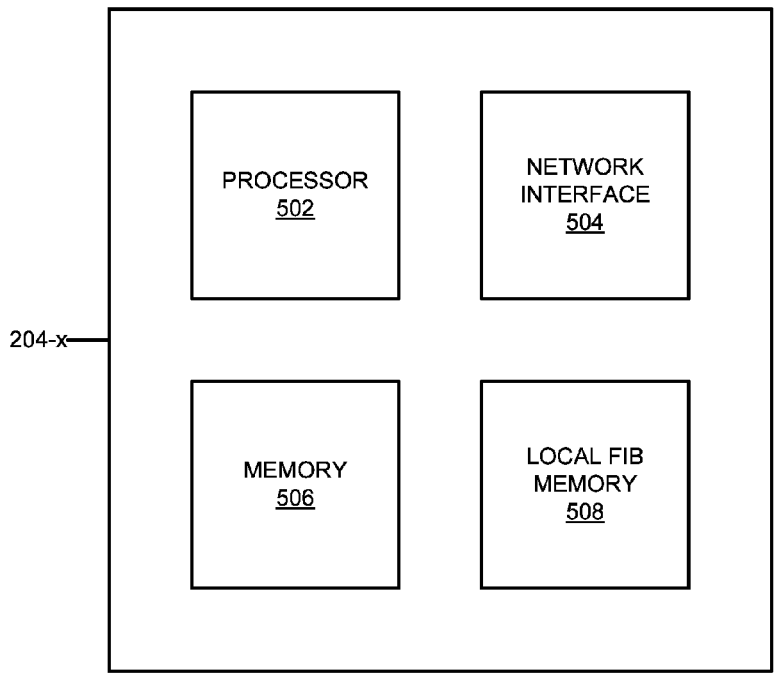
FIG. 5A is a block diagram illustrating exemplary components of an exemplary line card of FIG. 2.

FIG. 5A is a block diagram illustrating exemplary components of line card 204-x. As shown, line card 204-x may include a processor 502, network interface 504, memory 506, and local FIB memory 508. Depending on the implementation, line card 204-x may include additional, fewer, or different components than those illustrated in FIG. 5A. In addition, for simplicity and ease of understanding, FIG. 5A shows the memory of line card 204-x as two components, memory 506 and local FIB memory 508. In an actual implementation, memory 506 and local FIB memory 508 may be implemented as a single component or multiple components.

Processor 502 may include one or more processors, microprocessors, Application Specific Integrated Circuits (ASICs), and/or Field Programmable Gate Arrays (FPGAs), and/or other processing logic. In some implementations, processor 502 may include processors that are dedicated to more specific functions, such as memory management, packet forwarding, etc.

Network interface 504 may include one or more physical ports that enable line card 204-x to communicate with other devices, line cards, and/or systems. Via the physical ports, network interface 504 may communicate via a network, such as the Internet, a terrestrial wireless network (e.g., a WLAN), a satellite-based network, etc.

Memory 506 may include a static memory, such as read only memory (ROM), and/or dynamic memory, such as random access memory (e.g., DRAM, SDRAM, SRAM, etc.) or onboard cache, for storing data and machine-readable instructions. Memory 506 may provide, for example, space for queuing packets, packet headers, etc.

Local FIB memory 508 may include a component for storing master FIB 414 or a portion of master FIB 414 distributed by control module 202. Local FIB memory 508 may be a portion of a larger memory component, or a stand-alone component. In one implementation, local FIB memory 508 may include a high-speed memory component, such as a ternary content addressable memory (TCAM). TCAM can retrieve, given a key, content associated with the key in a fixed span of time.

Figure 5B:
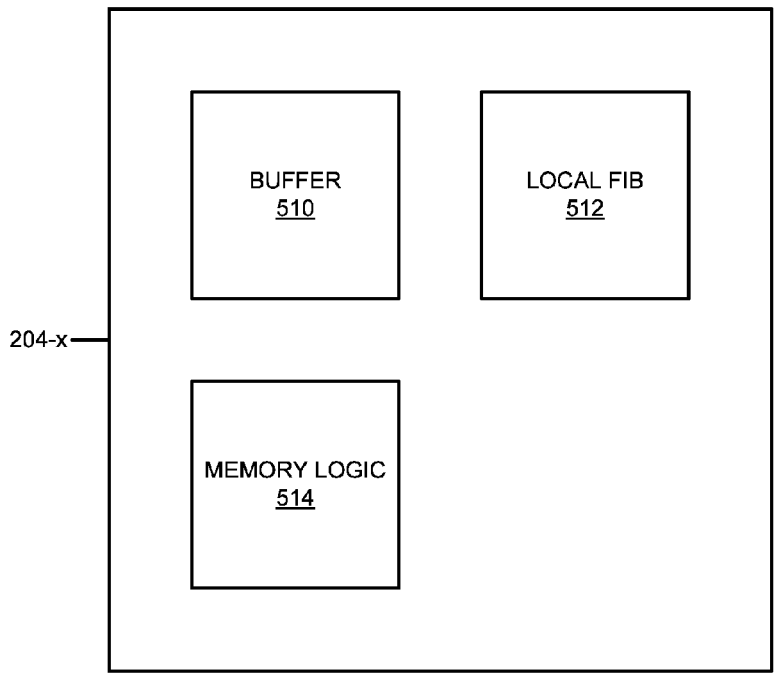
FIG. 5B is a block diagram illustrating exemplary functional components of the line card of FIG. 2.

FIG. 5B is a block diagram illustrating exemplary functional components of line card 204-x. As shown, line card 204-x may include a buffer 510, local FIB 512, and memory logic 514. Depending on the implementation, line card 204-x may include additional, fewer, or different components than those illustrated in FIG. 5B. For example, line card 204-x may include a component for storing/measuring flow statistics.

Buffer 510 may queue incoming packets and information about the packets. If packets arrive in a burst, one or more of the packets may await in buffer 510 until higher priority packets are processed and/or transmitted. Local FIB 512 may include all or a portion of master FIB 414.

Memory logic 514 may receive all or a portion of master FIB 414 from control module 202. Once memory logic 514 has stored all or the portion of master FIB 414 as local FIB 512, memory logic 514 may retrieve FIB entries on behalf of another component (e.g., processor 502) in line card 204-*x*. For example, memory logic 514 may obtain an identity of egress line card 204-*x* via which a received packet may leave router 102-*x*, by performing a lookup in local FIB 512 of line card 204-*x*, in local FIBs 512 of other line cards 204, and/or in master FIB 414. Further, memory logic 514 may update local FIB 512 based on a result of the lookup.

In the above, internal structures of local FIB 512 and memory logic 512 may reflect, in varying degrees, a mix of two different implementation strategies. At one extreme, local FIB 512 may be made to appear, to other components accessing contents of local FIB 512, as master FIB 414. At the other extreme, local FIB 512 may be made to appear as a portion of master FIB 414. In the former strategy, local FIB 512 may be implemented as a virtual version of master FIB 414, and in the latter strategy, local FIB 512 may be implemented as a segment of master FIB 414.

Figure 6A:
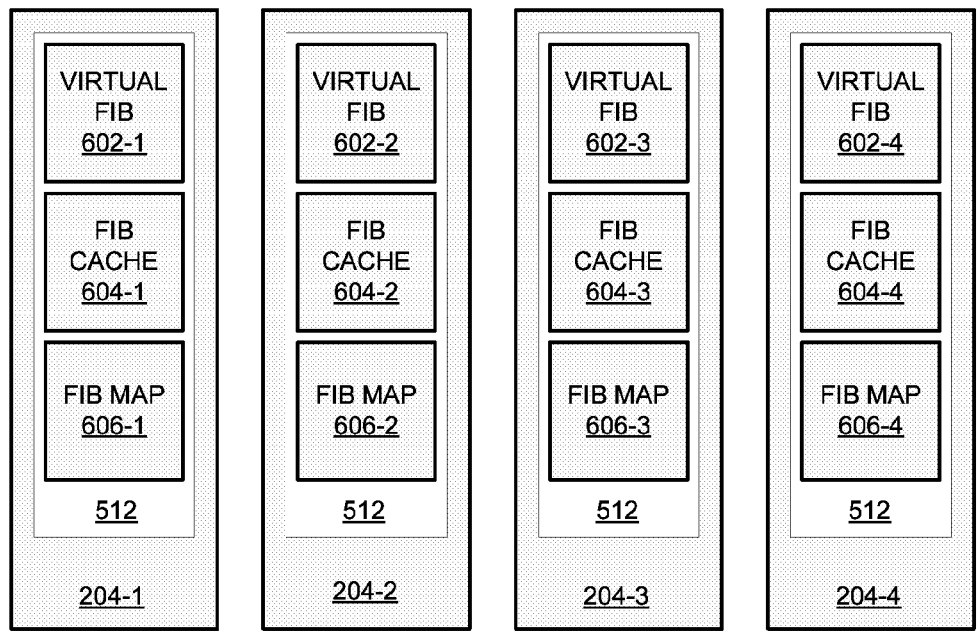
FIG. 6A illustrates exemplary contents of each local forwarding information base (FIB) of FIG. 5B in the line cards of FIG. 2 when each local FIB virtualizes the master FIB of FIG. 4B.

FIG. 6A illustrates exemplary contents of each local FIB 512 in line cards 204 when each local FIB 512 includes a virtual version of master FIB 414. As shown, local FIBs 512 in line cards 204 may include virtual FIBs 602-1 through 602-4 (collectively "virtual FIBs 602" and individually "virtual FIB 602-*x*"), FIB caches 604-1 through 604-4 (collectively "FIB caches 604" and individually "FIB cache 604-*x*"), and FIB maps 606-1 through 606-4 (collectively "FIB maps 606" and individually "FIB map 606-*x*"). Depending on the implementation, local FIB 512 in line card 204-1 may include additional, fewer, or different components. For example, in one implementation, FIB cache 604-*x* may be integrated into virtual FIB 602-*x*.

Virtual FIB 602-*x* may include a master FIB 414 portion that has been distributed to line card 204-*x* by memory logic 416. FIB cache 604-*x* may cache one or more of master FIB entries that memory logic 416 has distributed to other line cards 204. In some implementations, memory logic 514 may update FIB cache 604-*x* contents in accordance with the least recently used (LRU) algorithm. FIB map 606-1 may provide information for locating content that is associated with each address in the address space of virtual FIB 602-*x*.

In working with components shown in FIG. 6A, memory logic 514 in line card 204-*x* may use virtual FIB 602-*x*, FIB cache 604-*x*, and FIB map 606-*x* to provide non-uniform memory access (NUMA) to components on line card 204-*x* requesting a lookup of a destination address or CIDR prefix. When a packet arrives at line card 204-*x*, processor 502 may use FIB map 606-*x* to perform a lookup of a packet's destination address in local FIB 512.

If FIB map 606-*x* indicates that a FIB entry for the packet's destination address is in virtual FIB 602-*x*, processor 502 may retrieve the entry in virtual FIB 602-*x* to obtain the identity of egress line card 204-*y* through which the packet may leave router 102-*x* and travel toward its destination.

If FIB map 606-*x* indicates that the FIB entry is in other virtual FIBs 602, processor 502 may locate the entry either in FIB cache 604-*x*, or, in the event of a cache miss, in other virtual FIBs 602. If the entry is in FIB cache 604-*x*, processor 502 may update the time stamp associated with the entry. If the cache miss occurs, processor 502 may attempt to locate the entry in virtual FIBs 602 in other line cards 204 and/or master FIB 414 via a high speed communication bus between line cards 204 and/or control module 202. If processor 502 successfully finds the entry, processor 502 may import the entry into FIB cache 604-*x*.

Once the entry is found, router 102-*x* may send the packet to egress line card 204-*y* identified via the entry. Otherwise, router 102-*x* may dispatch an Internet Control Message Protocol (ICMP) message, indicating an unreachable destination, toward the packet's source address.

In FIG. 6A, the size of virtual FIB 602-*x* and FIB cache 604-*x* may depend on available memory space on local FIB memory 508 and the size of master FIB 414. For example, if local FIB memory 508/master FIB 414 is large/small enough, virtual FIB 602-*x* may include contents of entire master FIB 414. In such a case, processor 502 may not need to access and/or read virtual FIB 602 in other line cards 204 or cache non-local entries, at least until the size of master FIB 414 in control module 202 exceeds the size of memory space on local FIB memory 508.

Figure 6B:
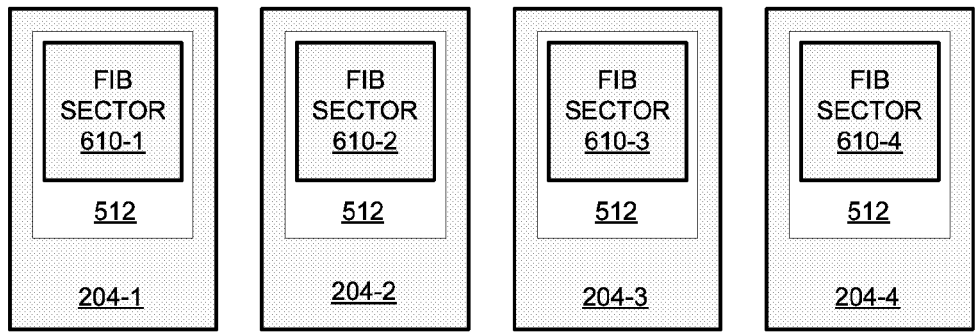
FIG. 6B illustrates exemplary contents of each local FIB of FIG. 5B in the line cards of FIG. 2 when each local FIB includes a segment of the master FIB of FIG. 4B.

FIG. 6B illustrates exemplary contents of each local FIB 512 in line cards 204 when each local FIB 512 includes a segment of master FIB 414. As shown in FIG. 6B, local FIB 512 in line cards 204 may include FIB sectors 610-1 through 610-4 (collectively "FIB sectors 610" and individually "FIB sector 610-*x*").

FIB sector 610-*x* may include a portion of master FIB 414. As described above, memory logic 416 in control module 202 may have partitioned master FIB 414 into segments and distributed each segment as FIB sector 610-*x* to each of line cards 204.

In FIG. 6B, when a packet arrives at line card 204-*x*, processor 502 may perform a lookup of a packet's destination address in FIB sector 610-*x*. If processor 502 is unable to locate the route in FIB sector 610-*x*, processor 502 may consult other FIB sectors 610 in other line cards 204 and/or master FIB 414. If processor 502 obtains an entry corresponding to the destination address, processor 502 may send the packet to egress line card 204-*x* corresponding to the entry via switch fabric 206, to be sent toward the packet's destination via network 100. If the entry is not found, router 102-*x* may dispatch an ICMP message indicating unreachable destination, toward the packet's source address.

In some implementations, local FIB 512 may not only include FIB sector 610-*x*, but also a FIB cache, similar to FIB cache 604-*x*, to improve memory access speed. In such implementations, the FIB cache may store frequently accessed non-local FIB entries in FIB sectors 610 in other line cards 204. In addition, the contents of the FIB cache may be updated based on the LRU algorithm.

In FIGS. 6A and 6B, when processor 502 in line card 204-*x* does not find an entry in local FIB 512 based on a received packet's destination, processor 502 may send a request to one, two, or more line cards 204, depending on information that FIB map 606 provides. For example, in one implementation, assume that local FIB 512 does not include FIB map 606-*x*. In such a case, processor 502 on line card 204-*x* may broadcast the request to identify egress line card 204-*y* to all other line cards 204, since line card 204-*x* does not know which of line cards 204 may have the routing entry. Subsequently, one of line cards 204 may reply with the routing entry corresponding to the destination address. In another example, assume that local FIB 512 includes FIB map 606-*x* that identifies which line card 204-*z* includes local FIB 512 that identifies the destination off egress line card 204-*y*. In such case, processor 502 on line card 204-*x* may send the request to line card 204-*y*, identified by FIB map 506-*x*.

Figure 7:
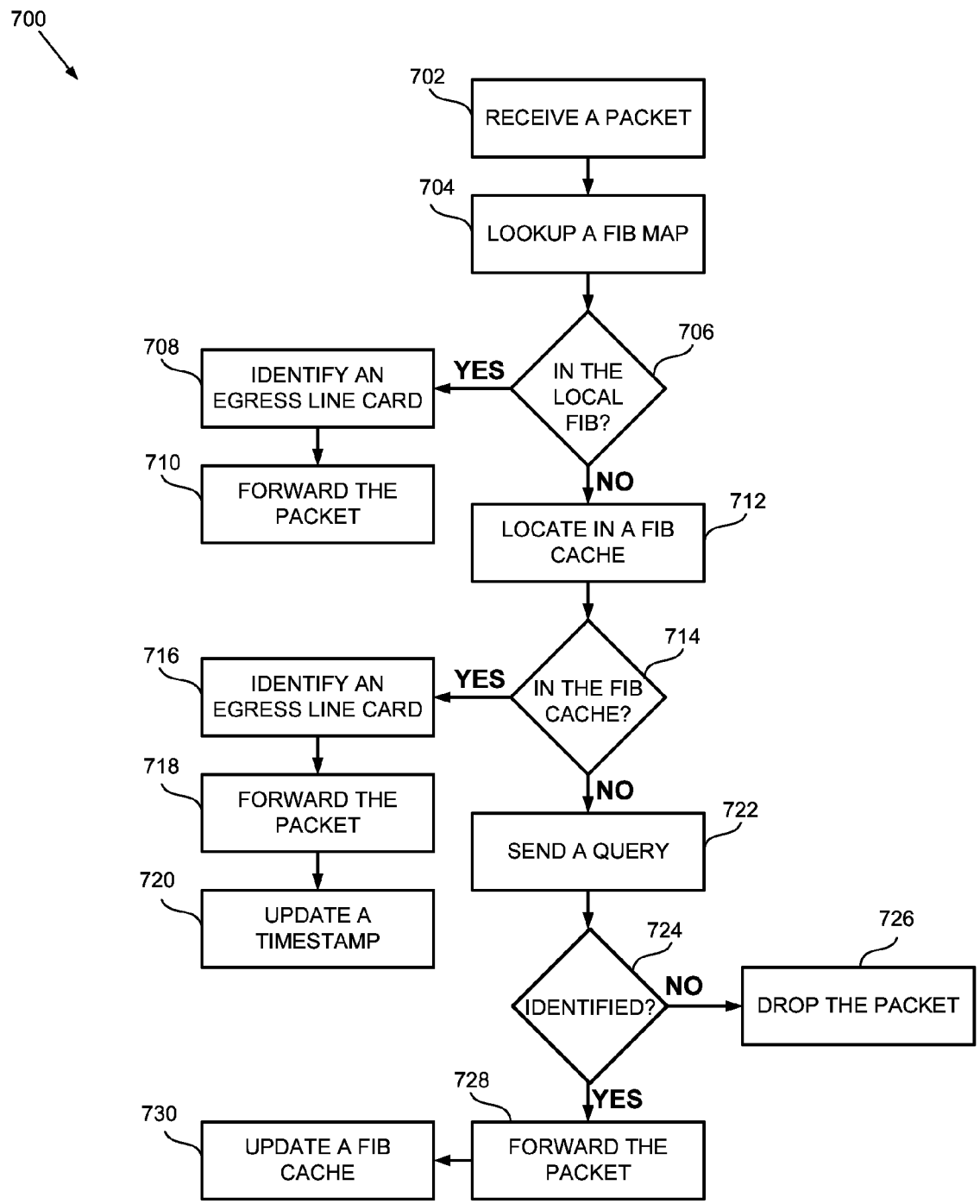
FIG. 7 is a flow diagram of an exemplary process associated with forwarding a packet at the line card of FIG. 2 when the line card implements the local FIB illustrated in FIG. 6A.

FIG. 7 is a flow diagram of an exemplary process 700 associated with forwarding a packet at line card 204-*x* that implements local FIB 512 illustrated in FIG. 6A. Assume that memory logic 416 has distributed some portion of master FIB 414 on control module 202 to line cards 204. Process 700 may start with line card 204-*x* receiving a packet at network interface 504 (block 702). In one implementation, a header and payload of the packet may be placed on separate buffers/ queues. In some implementations, processor 502 may perform additional processing, such as looking up an access control list, packet classification, etc.

Processor 502 may look up FIB map 606-*x* based on a destination address of the packet (block 704). Further, based on the lookup, processor 502 may perform a lookup of destination address or a CIDR prefix associated with the destination address in either local FIB 512 or local FIBs 512 in other line cards 204 (block 706).

If the destination address/CIDR prefix is in local FIB 512 (block 706—YES), processor 502 may obtain, based on the destination address/CIDR prefix, a routing entry in local FIB 512 (e.g., virtual FIB 602-*x*) and obtain the identity of egress line card 204-*y* (block 708). Further, processor 502 may forward the packet to egress line card 204-*y* via switch fabric 206 (block 710). Thereafter, egress line card 204-*y* may send the packet toward its destination via network 100.

If the destination address/the CIDR prefix is not in local FIB 512 (block 706—NO), processor 502 may perform a lookup of a routing entry based on the destination address/ CIDR prefix in FIB cache 604-*x* (block 712).

If the routing entry is in FIB cache 604-*x* (block 712—YES), processor 502 may identify egress line card 204-*y* based on information in the routing entry (block 716). In addition, processor 502 may forward the packet to egress line card 204-*y* (bock 718), so that the packet can be sent toward its destination in network 100. Just before or after forwarding the packet to egress line card 204-*y*, processor 502 may update a time stamp associated with the routing entry (block 720), and, thus, increase the duration of time for which the routing entry may remain in FIB cache 604-*x*.

If the routing entry is not in FIB cache 604-*x* (block 714—NO), a cache miss may result. Consequently, processor 502 may send one or more queries to other line cards 204 or to control module 202 (block 722), requesting line cards 204/ control module 202 to identify egress line card 204-*x* based on the destination address/CIDR prefix. Subsequently, each of line cards 204 that do not have the requested information may return a message indicating the destination address/CIDR prefix is unreachable.

If none of line cards 204 identifies egress line card 204-*y* in the messages (block 724—NO), router 102-*x* may drop the packet (block 726). In dropping the packet, router 102-*x* may send an ICMP error message toward the source address of the packet, indicating that the packet has been dropped and that the destination is unreachable. If at least one of line cards 204 identifies egress line card 204-*y* (block 724—YES), processor 502 may forward the packet to egress line card 204-*y* (block 728), to be sent toward the destination address via network 100.

At block 730, processor 502 may insert the routing information associated with the destination address/CIDR prefix in FIB cache 604-*x* (block 730) so that the information is locally available for a fast lookup. If there is no empty memory space available in FIB cache 604-*x*, the oldest entries or least recently used entries may be overwritten with the routing information. The oldest entries/least recently used routing entries may be identified by their time stamps, which are updated when the entries are accessed (see the above discussion of block 718). Processor 502 may also update FIB map 606-*x* to reflect any changes in FIB cache 604-*x*.

Figure 8:
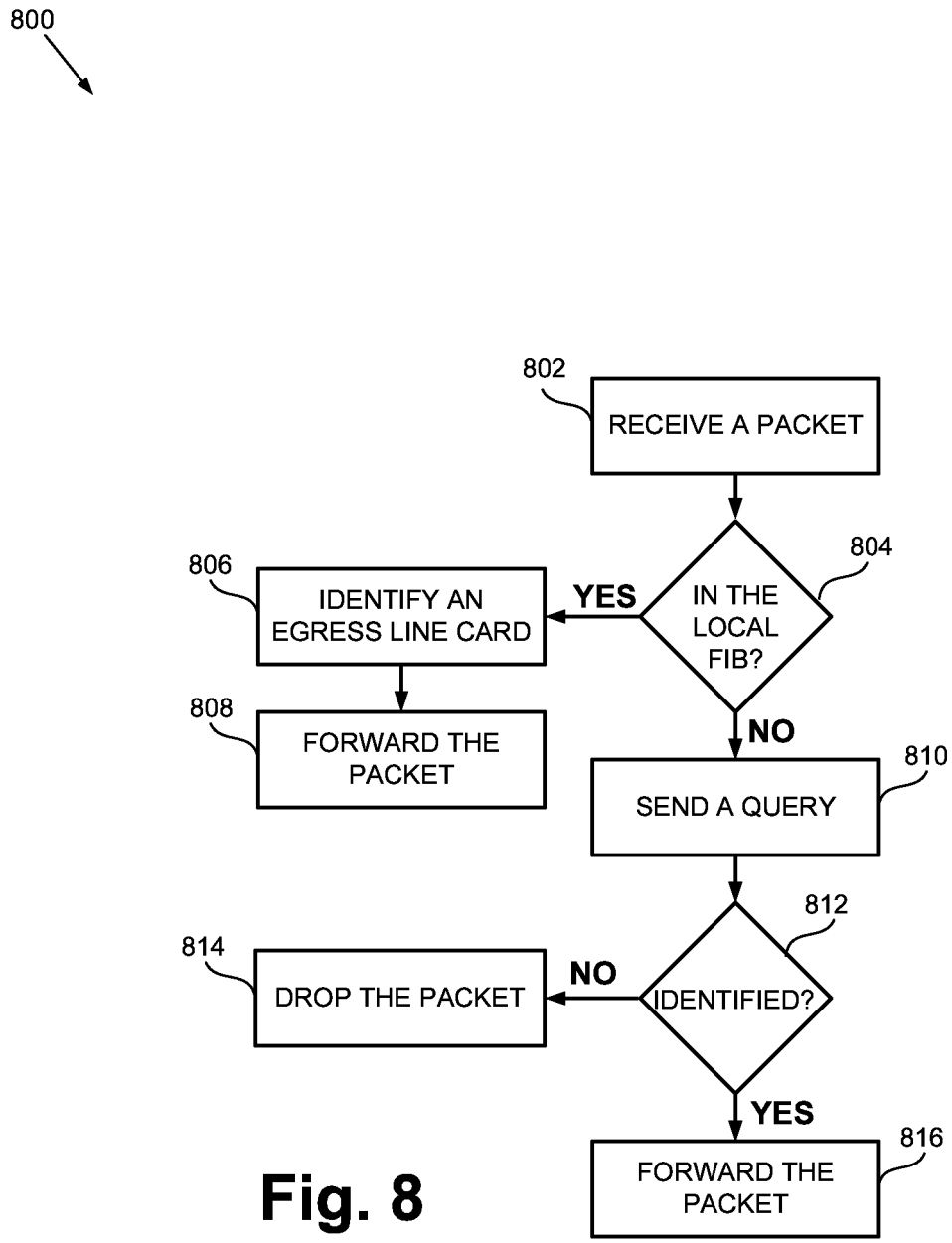
FIG. 8 is a flow diagram of an exemplary process associated with forwarding a packet at the line card of FIG. 2 when the line card implements the local FIB illustrated in FIG. 6B.

FIG. 8 is a flow diagram of an exemplary process 800 associated with forwarding a packet at line card 204-*x* that implements local FIB 512 illustrated in FIG. 6B. Assume that memory logic 416 has distributed a segment of master FIB 414 on control module 202 to line cards 204.

Process 800 may start with line card 204-*x* receiving a packet at network interface 504 (block 802). If a routing entry is in local FIB 512 (e.g., FIB sector 610-*x*) (block 806—YES), processor 502 may perform a lookup of the entry in local FIB 512 and obtain the identity of egress line card 204-*y* from which the packet may be forwarded to its destination (block 806). Subsequently, processor 502 may send the packet to egress line card (block 808).

If the routing entry for egress line card 204-*y* is not in local FIB 512 (block 804—NO), processor 812 may broadcast a query to other line cards 204 (block 810). In some implementations, processor 812 may send the query to specific line card 204-*z* based on information provided by a memory map (e.g., a FIB map) or other predetermined distribution method. In response, each of line cards 204 may send a reply to line card 204-*x*, either identifying egress line card 204-*y* or indicating the destination is unreachable.

If none of line cards 204 identifies egress line card 204-*y* in the replies (block 812—NO), processor 502 may drop the packet (block 816), in the manner similar to that described for block 726. If at least one of line cards 204 identifies egress line card 204-*y* (block 812—YES), processor 502 may forward the packet to egress line card 204-*y*, to be sent toward the destination.

In processes 700 and 800, when a packet is sent from ingress line card 204-*x* to egress line card 204-*y*, the packet header and its payload may be sent separately. At egress line card 204-*y*, the packet header and payload may be reassembled before or during its transmission from egress line card 204-*y* to network 100.

In the above, processes 700 and 800 illustrate how line card 204-*x* that implements local FIB 512 may forward a packet to egress line card 204-*y*. Because local FIB 512 may be smaller than master FIB 414 of router 102-*x*, using local FIB 512 in place of master FIB 414 may allow each of line cards 204 to consume less memory, and therefore, scale with increasing FIB entries over time.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in a different implementation, router 102-*x* may include a multi-protocol label switching (MPLS) switch/ router. Accordingly, control module 202 may distribute a master LFIB to line cards 204 in place of or in addition to master FIB 414. Additionally, line card 204-*x* may include a local LFIB (LFIB). Further, each local LFIB may include a virtual LFIB, LFIB cache, and LFIB map, analogous to virtual FIB 602-*x*, FIB cache 604-*x*, and FIB map 606-*x*. Still further, router 102-*x* may implement processes that are similar to processes 700 and 800 for forwarding a packet from line card 204-*x* in accordance with such an implementation.

In another example, while a series of blocks have been described with regard to the process illustrated in FIGS. 7 and 8, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a control module configured to:
      pseudo-randomly select, from a master table, sets of routing entries, or
      select, for each of a plurality of line cards, from the master table, a set of routing entries based on locality of the line card and the routing entries; and
      distribute each of the selected sets of routing entries to a corresponding one of the line cards, each of the sets including a portion of a master table for looking up routes based on network addresses;
   a first one of the plurality of line cards, configured to:
      receive one of the sets of routing entries,
      store the received set of routing entries in a local table,
      receive a packet from a network,
      obtain a routing entry using the local table based on an address associated with the packet,
      when the local table does not include the routing entry:
         requesting the routing entry from other line cards, and
         receiving the routing entry from the other line cards in response to the request for the routing entry; and
      send the packet to a second one of the plurality of line cards, the second line card associated with the obtained routing entry; and
   the second line card configured to forward the packet toward the address in the network.

2. The device of claim 1, wherein the first one of the plurality of line cards includes:
   a ternary content addressable memory (TCAM) for storing the local table; or
   a static random access memory (SRAM) for storing the local table.

3. The device of claim 1, wherein the master table includes at least one of:
   a master forwarding information base (FIB); or
   a master label forwarding information base (LFIB).

4. The device of claim 3, wherein the control module is further configured to:
   obtain a routing information base (RIB) based on routing messages exchanged with other devices in the network; and
   create the master forwarding information base (FIB) based on the RIB.

5. The device of claim 1, wherein the device includes:
   a multi-protocol label switching (MPLS) router.

6. The device of claim 1, wherein the local table includes at least one of:
   a segment of the master table;
   a virtual master table; or
   a cache to store routing entries that are in local tables of other line cards.

7. The device of claim 6, wherein when the control module is configured to pseudo-randomly select sets of routing entries, the control module is further configured to obtain the segment based on one of:
   pointer indices associated with the routing entries; or
   memory locations of the routing entries.

8. The device of claim 6, wherein the local table includes the cache and the cache is further configured to:
   update the stored routing entries based on a least recently used (LRU) algorithm.

9. The device of claim 6, wherein when obtaining the routing entry, the first one of the plurality of line cards is further configured to:
   broadcast queries to other line cards, the queries requesting the other line cards to provide the routing entry when the local table does not include the routing entry.

10. The device of claim 1, wherein when the control module is configured to pseudo-randomly select the sets of routing entries, the control module is further configured to:
    select the routing entries based on output of a random number generator; or
    select the routing entries in a round robin fashion.

11. A method comprising:
    forming a master forwarding information base (FIB);
    selecting, from the master FIB, routing entries to obtain portions of the master FIB;
    distributing each of the portions of the master FIB to a corresponding one of the line cards;
    storing, at a first one of the plurality of line cards, one of the portions of the master FIB as a local table;
    receiving, at the first one of the plurality of line cards, a packet from a network,
    obtaining, by the first one of the plurality of line cards, a routing entry using the local table based on an address associated with the packet;
    when the local table does not include the routing entry:
       requesting, by the first one of the plurality of line cards that receives the packet, the routing entry from other line cards, and
       receiving, by the first one of the plurality of line cards, the routing entry from the other line cards in response to the request for the routing entry; and
    forwarding the packet toward the address in the network.

12. The method of claim 11, wherein storing one of the portions of the master FIB includes:
    storing the local table in a ternary content addressable memory (TCAM); or
    storing the local table in a static random access memory (SRAM).

13. The method of claim 11, further comprising:
    gathering routing information from other devices in the network; and
    creating the master FIB based on the routing information.

14. The method of claim 11, wherein selecting, for each of the plurality of line cards, the routing entries based on locality includes:
    selecting routing entries from the master FIB based on an association between next-hop destinations in the routing entries and the first one of the plurality of line cards; and
    sending the selected routing entries to the first one of the plurality of line cards.

15. The method of claim 11, wherein selecting, for each of the plurality of line cards, from the master FIB, routing entries based on locality includes selecting the routing entries based on whether addresses, of classless inter-domain routing (CIDR) prefixes associated with the routing entries in the master FIB, are reachable from the line card.

16. The method of claim 11, further comprising:
    importing the routing entry into a cache at the first one of the plurality of cards for a fast lookup of the routing entry.

17. The method of claim 16, wherein requesting the routing entry from the other line cards includes:
broadcasting requests to the other line cards to provide the routing entry.

18. A method comprising:
forming a master forwarding information base (FIB);
partitioning the master FIB into portions by segmenting the master FIB based on one of:
classless inter-domain routing (CIDR) prefixes associated with routing entries in the master FIB,
pointer indices associated with the routing entries in the master FIB, or
memory locations associated with the routing entries in the master FIB;
distributing the portions of the master FIB to a plurality of line cards;
storing, at a first one of the plurality of line cards, one of the portions of the master FIB as a local table;
receiving, at the first one of the plurality of line cards, a packet from a network;
obtaining a routing entry using the local table based on an address associated with the packet;
forwarding the packet toward the address in the network;
receiving, at the first one of the plurality of line cards, a second packet from the network;
broadcasting requests to other line cards to provide a second routing entry for the second packet;
receiving messages that indicate a destination of the second packet is unreachable;
dropping the second packet; and
sending a message to a source associated with the second packet.

19. A router comprising:
means for creating a routing information base (RIB) based on signaling with other routers in a network;
means for deriving a forwarding information base (FIB) based on the RIB;
means for obtaining segments of the FIB, wherein the means for obtaining further comprises:
means for pseudo-randomly selecting, from the FIB, routing entries to form segments of the FIB, or
means for selecting, for each of a plurality of line cards, from the FIB, routing entries based on locality of the line card and the routing entries;
means for sending the segments of the FIB to the plurality of line cards in the router;
means for storing, at each of the plurality of line cards, one of the segments of the FIB as a local table;
means for receiving, at each of the plurality of line cards, a packet from the network;
means for obtaining, at each of the plurality of line cards, a routing entry using the local table based on a destination address of the received packet and when the local table does not include the routing entry for the packet, requesting and obtaining the routing entry from other line cards; and
means for forwarding, at each of plurality of the line cards, the packet toward the destination address of the packet in the network.

\* \* \* \* \*